Patented Feb. 18, 1941

2,231,945

UNITED STATES PATENT OFFICE 2,231,945

CALCIUM OXIDE-ZIRCONIUM OXIDE REFRACTORY

Gordon R. Pole, near Sheffield, Ala.

No Drawing. Application November 21, 1938, Serial No. 241,637

3 Claims. (Cl. 106—9)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of making highly refractory compositions and articles of manufacture.

The principal object of this invention is to produce a high melting point refractory which will withstand the corrosive action of basic slags and other basic melts, such as fused rock phosphate. Another object of this invention is to produce a zirconium oxide refractory with physical and chemical characteristics such that the structure of the refractory will not be materially affected by repeated treatment at high temperatures. Still another object of this invention is to provide a zirconium oxide refractory which is also stable in the presence of water vapor at relatively low temperatures. Other objects of this invention include the provision of a rapid and relatively economical procedure for the production of a stable refractory from commercial zirconium oxide suitable for use at relatively high temperatures.

It has been proposed to produce a zirconium oxide refractory bonded with a small proportion of lime in the order of 2 to 5 percent. It has also been proposed to add a small proportion of sodium silicate to such a calcium oxide-zirconium oxide mixture for the purpose of providing a more satisfactory bond. Neither of these nor similar proposals have resulted in the production of the zirconium oxide refractory which has the proper chemical and physical characteristics to withstand the corrosive action of fused basic materials at temperatures of the order of 1500° to 1550° C.

I have discovered a new high melting point refractory, and articles of manufacture produced from the same, made by firing a mixture of a substantial proportion of calcium oxide and zirconium oxide in proportions such that the composition is characterized by its resistance to hydration in air or in boiling water and its resistance to fused basic materials, such as rock phosphate, at temperatures of the order of 1500° to 1550° C. The preferred composition contains calcium oxide and zirconium oxide in the ratio of 40 mol percent and 60 mol percent.

One example for the production of highly refractory material according to my invention is given for the production of highly refractory crucibles. A mixture of 23 percent by weight (40 mol percent) of calcium oxide of approximately 200 mesh and 77 percent by weight (60 mol percent) of zirconium oxide of approximately 200 mesh, was dry-pressed in crucible forms and the pressed mixture fired to 1605° C. The crucibles resulting therefrom were found to be resistant to hydration both in air and in boiling water. Rock phosphate charged to the crucibles was fused, the melt poured and the process repeated with nine separate charges at temperatures between 1530° and 2550° C. with the result that the crucibles showed high resistance to corrosion by the fused rock phosphate.

A second example for the production of highly refractory material according to my invention is given for the production of highly refractory crucibles with a modification of the procedure given in the example above. A mixture of 23 percent by weight (40 mol percent) of calcium oxide in the form of calcium hydroxide of approximately 200 mesh and 77 percent by weight (60 mol percent) of zirconium oxide of approximately 200 mesh was dry-pressed into cylindrical shapes and fired to 1605° C. The fired shapes were crushed to a size that would produce a minimum of voids when subsequently dry-pressed in crucible forms. The fine refractory material was moistened with between 1 percent and 5 percent by weight of water, dry-pressed into crucible forms and the pressed crucibles fired to 1500° to 1605° C. The crucibles showed substantially less shrinkage than those produced according to the first example and they exhibited the same resistance to hydration and corrosion by fused rock phosphate.

A third example for the production of highly refractory material is given for the production of highly refractory crucibles. A mixture of 51.5 percent by weight of calcium oxide of approximately 200 mesh, and 48.5 percent by weight of zirconium oxide of approximately 200 mesh, was dry-pressed in crucible forms and the pressed mixture fired to 1605° C. The crucibles resulting therefrom exhibited substantially the same resistance to corrosion by fused rock phosphate but exhibited an objectionable feature of hydrating after firing when left to stand in air for any appreciable period of time.

It is evident that there are numerous factors which will influence conditions for the most satisfactory operation of my invention, the actual limits of which cannot be established except by a detailed study of each set of raw materials and the intermediate and finished products involved.

Calcium oxide melts at approximately 2572° C. and zirconium oxide melts at approximately 2687° C. An eutectic mixture of these two materials containing respectively approximately 40 mol percent calcium oxide and 60 mol percent zirconium oxide melts at approximately 2300° C. However, mixtures of commercial materials containing impurities usually associated therewith causes the refractory containing the oxides in the proportions indicated above to melt at somewhat lower temperatures.

I have found that mixtures of calcium oxide and zirconium oxide in proportions corresponding in general to the ratio contained in the specific eutectic mixture referred to above, namely, 40 mol percent of calcium oxide and 60 mol percent of zirconium oxide, produce a refractory which is resistant to hydration at low temperatures and is resistant to the corrosion of fused basic material, as represented by rock phosphate at high temperatures. The results obtained indicate that a composition containing calcium oxide and zirconium oxide in proportions corresponding approximately to 35 to 45 mol percent calcium oxide and 65 to 55 mol percent zirconium oxide will produce the most satisfactory product. Mixtures containing a very small proportion of calcium oxide do not result in the production of refractories which have satisfactory physical characteristics. Therefore, it is necessary for the refractory to have a substantial proportion of calcium oxide as indicated by the preferred composition. Mixtures containing a substantially higher percentage of calcium oxide than that indicated by the preferred composition are not entirely satisfactory due to their tendency to hydrate in air as shown by the third example. The exact limits of the ratio of calcium oxide to zirconium oxide has not been definitely established but as long as the composition contains a very substantial proportion of calcium oxide and at the same time not a substantial proportion of calcium oxide to result in the hydration of the prepared refractory in contact with air or boiling water it will be suitable for the purposes indicated. Calcium oxide may be used directly, but it is preferable to use the calcium oxide in the form of calcium hydroxide in order to avoid hydration of the former, particularly where dry-pressed unfired articles containing calcium oxide may be required to stand in a moist atmosphere for an appreciable time before firing. Likewise, high-grade commercial materials are preferred for the production of the refractory made according to my invention for reasons well known in the art.

I have found that raw materials in the proportions indicated may either be fired to approximately 1600° C. to form a highly refractory composition, dry-pressed in the form of crucibles, shapes or other articles of manufacture and fired to approximately 1600° C., or the fired refractory compositions may be crushed, dry-pressed into such forms and fired to temperatures of the order of 1500° to 1600° C. The latter procedure is preferable in the manufacture of large sized refractories since the preliminary firing produces a dense body and the use of such dense body in the production of articles reduces the shrinkage of the latter during processing to the minimum.

The refractory produced according to my invention is adapted to be used where resistance to high melting point basic melts is required. Throughout the description reference has been made to the resistance of this refractory to fused rock phosphate. This index has been used since it has been found that fused rock phosphate containing approximately 45 percent by weight of calcium oxide is one of the most corrosive of fused basic materials which may be encountered at temperatures of the order of 1500° to 1550° C.

It will be seen, therefore, that this invention actually may be carried out by the use of various modifications and changes without departing from its spirit and scope.

I claim:

1. As an article of manufacture a pressed and fired mixture substantially consisting of calcium oxide and zirconium oxide in proportions corresponding approximately to 40 mol percent and 60 mol percent respectively.

2. A high melting point refractory resistant to corrosion of fused rock phosphate which consists of a fired mixture of 35 to 45 mol percent of calcium oxide and 65 to 55 mol percent of zirconium oxide.

3. A high melting point refractory resistant to corrosion of basic material which consists of a fired mixture of substantially calcium oxide and zirconium oxide in proportions corresponding approximately to the eutectic mixture containing about 40 mol percent and 60 mol percent respectively.

GORDON R. POLE.

CERTIFICATE OF CORRECTION.

Patent No. 2,231,945.   February 18, 1941.

GORDON R. POLE.

It is hereby certified that error appears in the printed specification of the above numbered patent requiring correction as follows: Page 1, second column, line 10, for "2550° C." read --1550° C.--; and that the said Letters Patent should be read with this correction therein that the same may conform to the record of the case in the Patent Office.

Signed and sealed this 15th day of April, A. D. 1941.

(Seal)

Henry Van Arsdale,
Acting Commissioner of Patents.